(12) United States Patent
Meldrum (10) Patent No.: US 6,514,349 B1
(45) Date of Patent: Feb. 4, 2003

(54) PRODUCE WASHING SYSTEM UTILIZING MULTIPLE ENERGY SOURCES

(76) Inventor: Charles R. Meldrum, 125 Kenwood Rd., Grosse Pointe Farms, MI (US) 48236

( * ) Notice: Subject to any disclaimer, the term of this patent is extended or adjusted under 35 U.S.C. 154(b) by 0 days.

(21) Appl. No.: 09/661,492

(22) Filed: Sep. 14, 2000

Related U.S. Application Data (60) Provisional application No. 60/153,908, filed on Sep. 14, 1999.

(51) Int. Cl.$^7$ .............................. A23L 3/00; C02F 1/00
(52) U.S. Cl. ..................... 134/1; 134/19; 134/25.3; 134/34; 134/37; 134/42; 15/3.1
(58) Field of Search .................... 134/1, 19, 25.3, 134/34, 37, 42; 15/3.1

(56) References Cited

U.S. PATENT DOCUMENTS

| | | |
|---|---|---|
| 592,735 A | 10/1897 | Jones |
| 3,450,544 A | 6/1969 | Badran et al. |
| 3,699,976 A | 10/1972 | Abe et al. |
| 3,753,886 A | 8/1973 | Myers |
| 3,849,195 A | 11/1974 | Powell, Jr. et al. |
| 3,869,559 A * | 3/1975 | Clark .................... 426/481 |
| 3,945,170 A | 3/1976 | Brown |
| 3,974,355 A | 8/1976 | Bach |
| 4,091,119 A | 5/1978 | Bach |
| 4,178,188 A | 12/1979 | Dussault et al. |
| 4,224,347 A | 9/1980 | Woodruff |
| 4,409,999 A | 10/1983 | Pedziwiatr |
| 4,524,079 A | 6/1985 | Hofmann |
| 4,622,229 A | 11/1986 | Toshitsugu |
| 4,665,898 A | 5/1987 | Costa et al. |
| 4,672,984 A | 6/1987 | Ohhashi |
| 4,695,472 A | 9/1987 | Dunn et al. |
| 4,711,789 A | 12/1987 | Orr et al. |
| 4,838,154 A | 6/1989 | Dunn et al. |
| 4,847,145 A | 7/1989 | Matsui |
| 4,865,060 A | 9/1989 | Shibano |
| 4,875,407 A | 10/1989 | Inagaki |
| 4,883,674 A | 11/1989 | Fan |
| 4,893,320 A | 1/1990 | Yanagi et al. |
| 4,895,729 A | 1/1990 | Powrie et al. |
| 4,907,611 A | 3/1990 | Shibano |
| 4,943,440 A | 7/1990 | Armstrong |
| 4,959,230 A | 9/1990 | Wyss et al. |
| 4,961,943 A | 10/1990 | Blanthorn et al. |
| 4,984,597 A | 1/1991 | McConnell et al. |
| 4,996,062 A | 2/1991 | Lehtonen et al. |
| 5,026,564 A | 6/1991 | Hayden |
| 5,048,404 A | 9/1991 | Bushnell et al. |
| 5,049,400 A | 9/1991 | Hayden |
| 5,091,152 A | 2/1992 | Thomas, Sr. |
| 5,097,755 A | 3/1992 | Hill |

(List continued on next page.)

FOREIGN PATENT DOCUMENTS

| | | | | |
|---|---|---|---|---|
| JP | 03-087168 | * | 4/1991 | .......... A23N/12/02 |
| JP | 06-315346 | * | 11/1994 | ........... A23B/7/158 |
| JP | 11-156313 | * | 6/1999 | ............. B08B/3/12 |

*Primary Examiner*—Randy Gulakowski
*Assistant Examiner*—Jiri Smetana
(74) *Attorney, Agent, or Firm*—Cantor Colburn LLP (57) ABSTRACT

A produce cleaning system (20) and process (10) that employs plural forms of energy in an ionic liquid-based washing system (22, 24, 26) is described. The washing system (22, 24, 26) includes employing solvents and solutes in the wash bath (24) which promote the conduction of electrical energy. The electrical energy can be applied to the produce in the wash bath (24) in various waveforms, such as a modulating wave superimposed on a carrier wave. Additionally, ultrasonic energy is employed to provide high-frequency mechanical pressure waves against the produce. The electrical energy and the mechanical energy combine to produce energy in the applicable resonant frequency range that acts to destroy or transform pathogens, dirt and synthetic molecules that may exist on the produce to either destroy them or render them harmless.

22 Claims, 3 Drawing Sheets

U.S. PATENT DOCUMENTS

| | | | |
|---|---|---|---|
| 5,113,881 A | 5/1992 | Lin et al. | |
| 5,139,684 A | 8/1992 | Kaali et al. | |
| 5,188,738 A | 2/1993 | Kaali et al. | |
| 5,229,152 A | 7/1993 | Meldrum | |
| 5,235,905 A | 8/1993 | Bushnell et al. | |
| 5,244,684 A | 9/1993 | Tong et al. | |
| 5,250,160 A | 10/1993 | Oksman et al. | |
| 5,269,216 A | 12/1993 | Corominas | |
| 5,282,940 A | 2/1994 | Griffis et al. | |
| 5,285,548 A | 2/1994 | Moll | |
| 5,288,459 A | 2/1994 | Lawrence | |
| 5,290,580 A | 3/1994 | Floyd et al. | |
| 5,290,583 A | 3/1994 | Reznik et al. | |
| 5,316,778 A | 5/1994 | Hougham | |
| 5,326,530 A | 7/1994 | Bridges | |
| 5,328,451 A | 7/1994 | Davis et al. | |
| 5,334,619 A | 8/1994 | Vaughn et al. | |
| 5,364,648 A | 11/1994 | Meldrum | |
| 5,374,437 A | 12/1994 | Lagares Corominas | |
| 5,378,287 A | 1/1995 | Pedziwiatr | |
| 5,405,631 A | 4/1995 | Rosenthal | |
| 5,415,882 A | 5/1995 | Knipper et al. | |
| 5,433,142 A | 7/1995 | Roth | |
| 5,447,733 A | 9/1995 | Bushnell et al. | |
| 5,465,655 A | 11/1995 | Papetti | |
| 5,498,431 A | 3/1996 | Lindner | |
| 5,531,157 A | 7/1996 | Probst | |
| 5,533,441 A | 7/1996 | Reznik et al. | |
| 5,537,916 A | 7/1996 | Lagares-Corominas | |
| 5,547,693 A | 8/1996 | Krochta et al. | |
| 5,549,041 A | 8/1996 | Zhang et al. | |
| 5,562,114 A | 10/1996 | St. Martin | |
| 5,565,230 A | 10/1996 | Bailey | |
| 5,588,357 A | 12/1996 | Tomikawa et al. | |
| 5,607,613 A | 3/1997 | Reznik | |
| 5,609,900 A | 3/1997 | Reznik | |
| 5,645,092 A * | 7/1997 | Beaumont | 134/102.2 |
| 5,656,095 A | 8/1997 | Honda et al. | |
| 5,662,031 A | 9/1997 | Qin et al. | |
| 5,670,198 A | 9/1997 | Reznik et al. | |
| 5,690,978 A | 11/1997 | Yin et al. | |
| 5,697,291 A | 12/1997 | Burgener et al. | |
| 5,741,539 A | 4/1998 | Knipper et al. | |
| 5,768,472 A | 6/1998 | Reznik | |
| 5,771,336 A | 6/1998 | Polny, Jr. | |
| 5,776,529 A | 7/1998 | Qin et al. | |
| 5,820,694 A | 10/1998 | St. Martin | |
| 5,824,274 A | 10/1998 | Long | |
| 5,825,036 A | 10/1998 | Ishikawa | |
| 5,834,871 A | 11/1998 | Puskas | |
| 5,837,303 A | 11/1998 | Hayden | |
| 5,849,678 A * | 12/1998 | Murch et al. | 510/111 |
| 5,858,116 A * | 1/1999 | Kim | 134/253 |
| 5,858,430 A | 1/1999 | Endico | |
| 5,858,435 A | 1/1999 | Gallo | |
| 5,862,821 A | 1/1999 | Rodriguez | |
| 5,872,091 A * | 2/1999 | Cuperus et al. | 510/300 |
| 5,879,471 A * | 3/1999 | St. Martin | 134/10 |
| 5,879,732 A | 3/1999 | Caracciolo, Jr. et al. | |
| 5,891,499 A * | 4/1999 | Balsano | 426/335 |
| 5,937,877 A * | 8/1999 | Rodriguez | 134/61 |
| 5,997,654 A * | 12/1999 | Murch et al. | 134/6 |

\* cited by examiner

_Fig-4_

_Fig-5_

_Fig-6_

Fig-8

PRODUCE WASHING SYSTEM UTILIZING MULTIPLE ENERGY SOURCES

CROSS-REFERENCE TO RELATED APPLICATION

This patent application claims priority to U.S. Provisional Patent Application Serial No. 60/153,908 filed Sep. 14, 1999, the entire specification of which is incorporated herein by reference.

BACKGROUND OF THE INVENTION

1. Field of the Invention

This invention relates generally to a produce washing system and, more particularly, to a produce washing system that employs a combination of bioelectrification energy and ultrasonic energy in a heated wash bath to remove or disable pathogens and other contaminants from the produce.

2. Discussion of the Related Art

The cleaning of produce to remove pathogens, including fungi, bacteria and viral forms, is increasingly important. After harvest, the exterior surface of produce is generally contaminated with fungicides and herbicides as a result of the growing process. Also, environmental pollutants, including various halogenated long-chain hydrocarbons and other synthetic chemical compounds, some of which are known to cause cancer in sufficiently concentrated forms, can sometimes be found on produce being shipped to the United States from foreign sources. Domestically grown produce, while sometimes better in terms of the overall level of contaminants, is still not free from synthetically produced chemicals resulting from herbicide and pesticide applications, from transportation and packaging, and from standard practices in the industry. Thus, it is desirable to have a washing system which provides cleaning of these undesirable pathogens, synthetic chemicals and non-naturally occurring substances from the produce prior to final shipment and sale to consumers.

Many produce cleaning procedures currently used in the industry only involve washing the produce in a water-based bath, or the like, to remove undesirable contaminants existing on the produce. Washing produce in water is limited in its ability to remove many pathogens and other contaminants, however. Therefore, more significant produce cleaning procedures have been proposed in the art.

U.S. Pat. No. 5,229,152 issued to Meldrum Jul. 20, 1993 discloses a process for extending the shelf life of produce, which includes immersing the produce in a snap freeze slurry that consists of by-products of the produce and certain sugars and acids. Prior to the produce being exposed to the snap-freeze slurry, it is immersed in a heated wash bath to remove dirt and other contaminants. The wash bath is subjected to ultrasonic sound waves to promote cleaning. The combination of the elevated temperature and mechanical vibration makes active and exposes the different microorganisms which may exist on the produce.

Although the process of vibrating the wash bath at ultrasonic frequencies has been successful in removing pathogens and other contaminants from the produce, this produce washing process can be improved upon to further clean the produce and make it safer for human consumption.

Accordingly, it is an object of the present invention to create a higher quality washing system for produce, and a cleaner environment in which to handle produce.

It is another object of the present invention to provide an enhanced cleaning system using a multitude of forms of energy to help remove pathogens, synthetic chemicals, long dirt chains, as well as other contaminants.

SUMMARY OF THE INVENTION

In order to achieve this higher level of produce cleaning, the present invention proposes a washing system and process, according to a first aspect of the invention, that employs plural forms of energy in an ionic liquid-based washing system. The ionic liquid-based washing system includes solvents and solutes which promote the conduction of electrical energy. The electrical energy can be applied to the produce in various waveforms. The electrical energy in the various waveforms as described herein is generally referred to as bioelectrification. In addition, ultrasonic energy is employed to provide high-frequency mechanical pressure waves that agitate the produce to provide for the mechanical micromovement of the pathogens, dirt complexes, and other foreign substances on the surface of the produce.

The electrical energy and the mechanical energy combine to produce energy in the applicable resonant frequency range that acts to transform the pathogens, dirt and synthetic molecules so as to either destroy them or render them harmless. This breakdown of the pathogens and other constituents occurs both at the electrical level and the mechanical level. In addition, the electrical energy and/or mechanical energy promotes a decoupling of the harmful substances from the epithelial tissues of the produce. The harmful substances are put into solution and are ultimately carried away from the produce. The pathogens and other harmful substances in the solution may be removed by filtering, electrostatic precipitation, centrifugal action or any other desirable technique. In addition, the produce itself may simply be removed from the liquid bath, thus leaving pathogens behind. The produce may then be rinsed in a rinse tank or stabilization tank which helps further disassociate loose particles may still be clinging to the surface of the produce.

According to a second aspect of the invention, bioelectrification of liquid solvent/solute solutions containing the produce to be cleaned therein is used alone. In this particular preferred process, an alternating electrical energy source applies a current through a pair of opposed electrodes located on opposite sides of the tank to conduct electricity through the liquid medium which contains cations or anions to help conduct the electricity through the water-based solution. The electrical waveform can include a high frequency waveform modulated thereon to provide different levels of electrical resonance.

Additional objects, features and advantages of the present invention will become apparent from the following description and appended claims, taken in conjunction with the accompanying drawings.

DETAILED DESCRIPTION OF THE PREFERRED EMBODIMENTS

The following discussion of the preferred embodiments directed to using electrical and mechanical waveforms to wash produce is merely exemplary in nature, and is in no way intended to limit the invention or its applications or uses.

Figure 1:
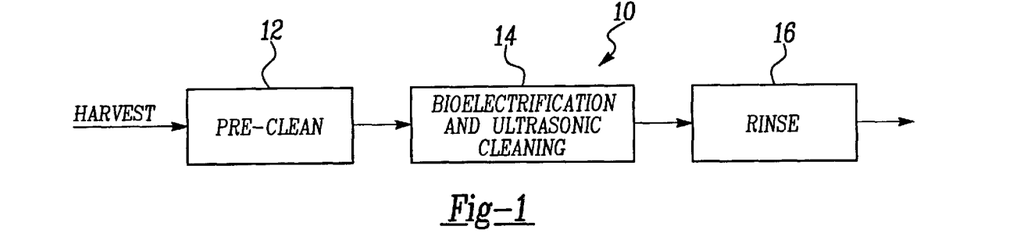
FIG. 1 is a functional block diagram generally showing various cleaning steps for produce, according to an embodiment of the present invention.

The present invention proposes a produce cleaning system and process that employs suitable energy sources to expose the produce to a bioelectrification waveform, or a combination of a bioelectrification waveform and an ultrasonic waveform, in a heated wash bath. FIG. 1 is a general flow diagram 10 of the cleaning steps for the produce, according to one embodiment of the invention. In a first step, recently harvest produce is conveyed to a prewash step at box 12 where dirt, excess foliage, and other larger particulates are removed therefrom. The prewash step 12 may employ any suitable liquid such as water, including a mild detergent suitable for produce cleaning. The prewash liquid may be heated to an elevated temperature, or may be at room temperature.

Next, the produce is sent from the prewash step 12 to an energizing step at box 14 where the produce is exposed to electrical and/or mechanical waveforms. The energizing step 14 includes using suitable electrical energy sources that generate electrical waveforms for removing pathogens and other contaminants from the produce, consistent with the discussion herein. Additionally, ultrasonic transducers are employed in the step 14 to generate mechanical waveforms that also act to remove pathogens from the produce. The energizing step 14 can use any suitable ionic liquid that includes solutes and solvents for promoting electrical conduction through the tank 14, so that the produce is suitably exposed to the radiation. In a preferred embodiment, the liquid used in the energizing step 14 is heated, to further promote the excitation and removal of the various pathogens being effected by the cleaning process. A more detailed discussion of how the electrical and mechanical waveforms are generated and interact with the produce is given below.

The cleaned produce from the step 14 is then conveyed to a stabilization step at box 16 where it is rinsed and temperature stabilized. The stabilization step 16 also employs a water-based liquid, and can also be heated to further promote removal of any excess material that still may exist on the produce. The produce is then ready to be sent to subsequent produce processing steps, such as the snap freeze slurry disclosed in the '152 patent.

The present invention contemplates a continuous conveyor system that sends the produce to the prewash step 12, from the prewash step 12 to the energizing step 14, from the energizing step 14 to the stabilization step 16, and from the stabilization step 16 to the next produce processing stage. The tanks used in the steps 12, 14 and 16 can be of any size suitable for a particular produce and/or volume of produce to be washed. The system can be set up so that the produce is gravity fed from an inlet to the tank to an outlet of the tank. Suitable flow control systems can be provided to cause the produce to move in a desired direction from inlet to outlet, such as in a circular motion around the tank. Of course, the flow control can control the speed of the produce through the washing system so that it is effectively cleaned. Further, specialized filters and the like can be provided to filter the various water-based solutions in the tanks so that pathogens and contaminants removed from the produce are removed from the tanks in a desirable manner.

Figure 2:
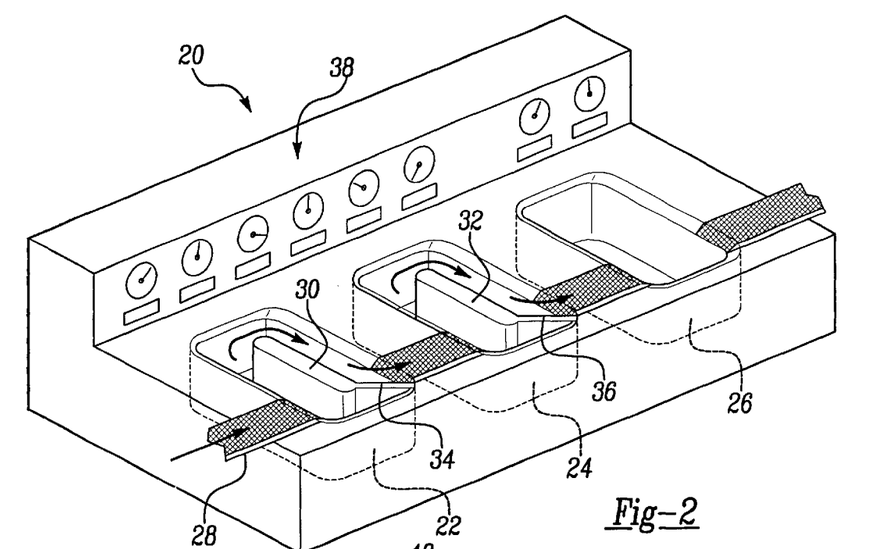
FIG. 2 is a perspective view of a produce cleaning system of the invention showing tanks for the cleaning steps identified in FIG. 1.

FIG. 2 is perspective view of a produce cleaning system 20 for the steps 12, 14 and 16 discussed above. The cleaning system 20 includes a preclean tank 22, an energizing tank 24 and a stabilization tank 26, representing each of the cleaning steps 12, 14 and 16, respectively. Each tank 22, 24, 26 is filled with a liquid based cleaning solution consistent with the discussion herein. A conveyor system 28 directs the produce into the preclean tank 22, and then from the tank 22 to the energizing tank 24, and then on to the stabilization tank 26. Any suitable conveyor system consistent with the discussion herein can be used to move the produce from tank to tank. A flow control system is employed to cause a liquid-based fluid to flow through the tanks 22, 24, 26 at a desirable rate suitable for cleaning the produce. The preclean tank 22 includes a center island 30 and the energizing tank 24 includes a center island 32 so that the fluid is caused to flow around the center islands 30 and 32 in a clockwise direction. A barrier 34 is provided in the tank 22 to collect the produce and cause it to enter the next stage of the conveyor system 28. Likewise, a barrier 36 is provided in the energizing tank 24 to collect the cleaned produce and cause it to go into the next stage of the conveyor system 28 to the tank 26. It will be appreciated by those skilled in the art, that this description of the conveying method of the produce is by example, and that other techniques can be employed. A series of controls, gauges and dials 38 monitor the system, and allow an operator to make adjustments to the various parameters of the system 20.

Figure 3:
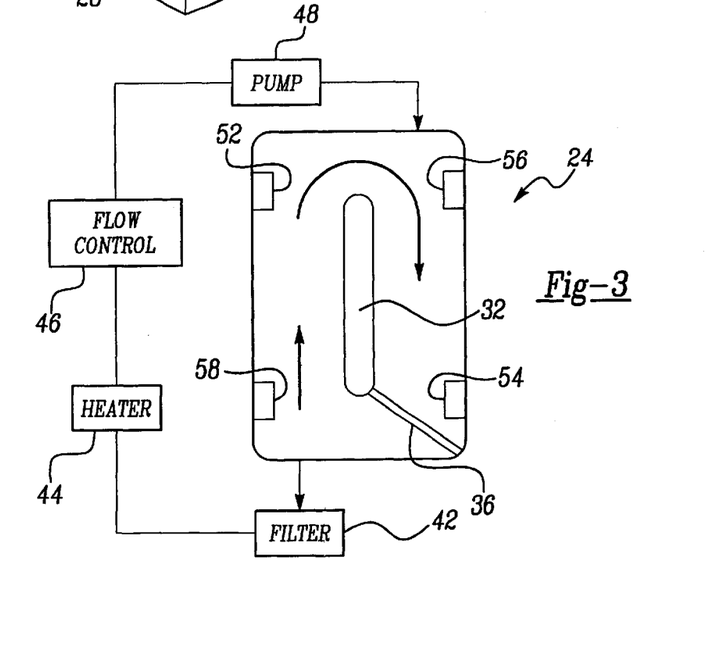
FIG. 3 is a top view of the bioelectrification and ultrasonic cleaning tank of the produce cleaning process of the invention.

FIG. 3 is a top view of the energizing tank 24, according to one embodiment of the present invention. The produce enters the tank 24 from the conveyor system 28. The solution circulates through a flow control system so that the solution in the tank 14, and thus the produce, flow in a clockwise direction around the center island 32. The produce is collected by the conveyor system 28 and sent to the stabilization tank 26. The flow control system includes a filter 42 for filtering out the various contaminants and the like removed from the produce by the cleaning process. Other filtration techniques can be employed as would be apparent to those skilled in the art. A heater 44 heats the fluid in the flow control system to a desirable elevated temperature, for example, 95° F. A flow control 46 includes valves and the like to control the rate of the fluid through the flow control system and the tank 24. A pump 48 pumps the fluid to cause it to flow through the flow control system. A pair of ultrasonic transducers 52 and 54 are positioned diagonally opposed to each other within the tank 24. The transducers 52 and 54 generate the mechanical ultrasonic wave that causes the produce to vibrate, consistent with the discussion herein. Likewise, a pair of electromagnetic energy sources or electrodes 56 and 58 are also positioned within the tank 24 diagonally opposed to each other as shown to conduct a current across the tank 24.

Figure 4:
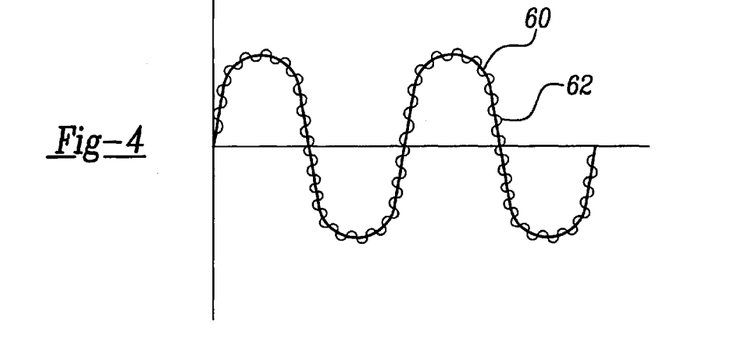
FIG. 4 is an electrical waveform for the bioelectrification energy used to clean the produce according to the invention.

FIG. 4 is an example of the electrical waveform, according to one embodiment, generated by the electrodes 56 and 58 that is used to activate and remove the various pathogens and contaminants on the produce. Preferably, the electrical waveform generated by the electrodes 56 and 58 includes a major carrier wave 60 having an amplitude in the range of 5 volts to 100 volts, with 8 volts to 24 volts being preferred (peak-to-peak). The carrier wave 60 is preferably in the frequency range of 10 Hz to 100 kHz, where the frequency range of 100 Hz to 50 kHz is preferred.

In addition, a much higher frequency sinusoidal modulating wave 62 is imposed upon the carrier wave 60. The higher modulating wave 62 imposed upon the carrier wave 60 is preferably a decade or more higher than the carrier wave 60 in frequency. A complex of higher frequency waves may also be employed. For example, if the carrier wave 60 is operating at 400 Hz (a standard frequency available for many electronic systems), the modulating frequencies may be applied at 4 kHz, 8 kHz, 12 kHz, 16 kHz, 20 kHz up through 40 kHz. Such harmonics are easily obtainable using conventional electronic equipment and signal generators.

Figure 5:
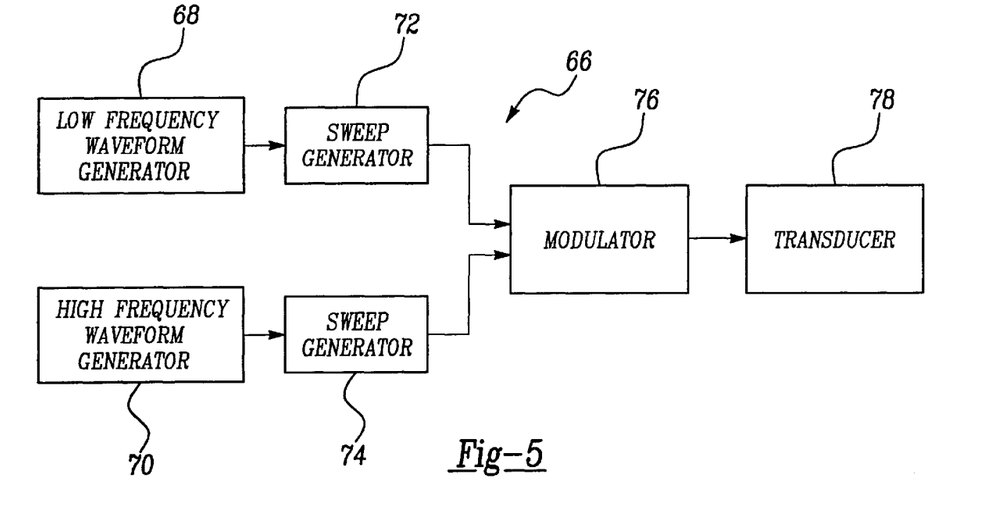
FIG. 5 is a schematic block diagram identifying the electronics used to operate the bioelectrification transducers.

FIG. 5 is schematic block diagram 66 showing the electronics for generating the carrier wave 60 and the modulating wave 62. The block diagram 66 includes a low frequency waveform generator 68 for generating the carrier wave 60, and a high frequency waveform generator 70 for generating the modulating wave 62. A sweep generator 72 receives the carrier wave 60 from the generator 68, and a sweep generator 74 receives the modulating wave 62 from the generator 70. The sweep generator 72 and 74 cause the frequency of the carrier wave 60 and the modulating wave 62 to sweep from one frequency to another frequency within a desirable frequency range so as to affect more of the pathogens and the like on the produce, consistent with the discussion herein. The carrier wave 60 and the modulating wave 62 are then applied to a modulator 76 that modulates the high frequency wave on to the low frequency carrier wave 60. A modulated wave is then applied to a transducer 78 that represents the electrodes 56 and 58.

The carrier wave 60 establishes an electrical current in the solution in the tank 24. The higher frequency modulating wave 62 provides microelectrification of the microscopic structures of the pathogens and other contaminants existing on the produce. This microelectrification causes the various pathogens and the like to be destroyed, decoupled, disintegrated, or otherwise neutralized. The particular frequency of the modulating wave 62 is selected to be in resonance with certain pathogens to provide the best effect. Both the carrier wave 40 and the modulating wave 62 can be swept in frequency, independently of each other or in combination, from a first predetermined frequency to a second predetermined frequency to generate resonant frequencies for the various pathogens and contaminants that may exist on the produce. For example, the carrier wave 60 can be swept in frequency from 10 Hz to 100 kHz, and the modulating wave 62 can be swept from 4 kHz to 200 kHz, depending on the desired pathogens being destroyed, the produce being cleaned, and the relationship of the carrier wave 60 to the modulating wave 62.

The current levels to be achieved in the solution from the electrical waveform is measured in milliamps per square centimeter. A suitable range would be 1 milliamp per square centimeter up to 1,000 milliamps per square centimeter, with amperages in the range of 5 milliamps per square centimeter to 500 milliamps per square centimeter being preferred. The particular current density selected depends in part upon the type of pathogens or other compounds to be cleaned from the produce. For example, some larger structures, including synthetic chemical compounds, such as polychlorinated biphenols and halogenated compounds, may require greater electric field densities to disrupt the pathogens, and thus require a proportionally greater electric field strength or electric current.

The higher frequency modulating wave 62 on the carrier wave 60 essentially causes the electric field to oscillate back and forth as it moves along the surface of the produce, thus causing a microelectrification of the physical objects, including the macro-molecular structures projecting like appendages from the epithelial layer of the produce. These appendages are like cilia or fine hairs which are subjected to mechanical motions moving backwards and forwards, both by the ultrasonic energy and as a result of the electrical energy. In addition, the electric fields are further stratified and tend to flow along the surface of these macro-molecules, thus establishing electrical field gradients and putting mechanical stresses induced by the electrical fields on these appendages, thus in many instances, rupturing the exoskeletal structure of the appendages while leaving the larger epithelial layer intact. Accordingly, these broken exoskeletal structures are thus free to float away in the solution away from the produce.

Figure 6:
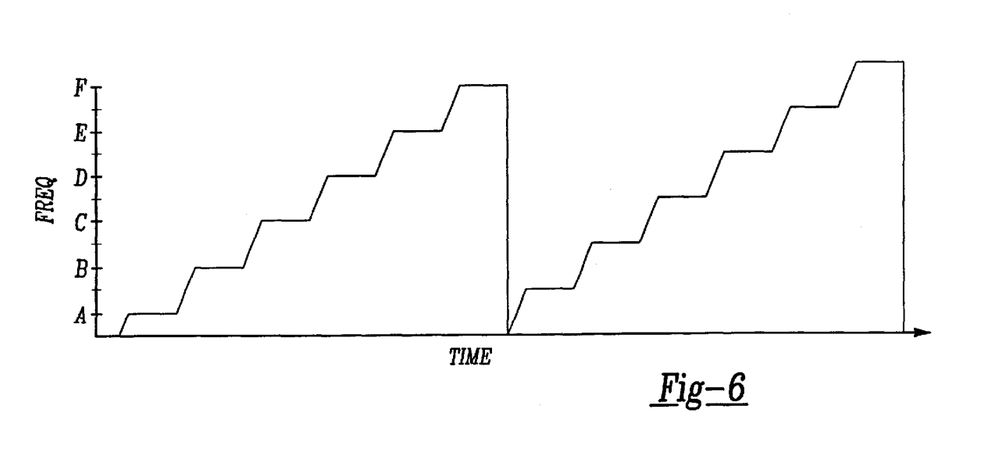
FIG. 6 is a graph with frequency on the vertical axis and time on the horizontal axis showing ramping step function of the electrical waveform of the invention.

FIG. 6 is a graph with frequency on the vertical axis and time on the horizontal axis. The frequency axis is separated into periodic divisions A–F, where each division represents an increase in frequency by a predetermined amount. For example, each division can represent a decade in frequency. The frequency of the electrical energy is ramped up from an initial frequency at the low end of the frequency range at a certain point in time, until it reaches division A. The frequency then stops ramping, and stays at this frequency for a predetermined period of time. This ramping function continues for each division until a certain high end of the frequency range is reached. Each stop at each division represents a particular frequency that the produce is subjected to for a predetermined amount of time to break down and/or destroy the pathogens. The frequency divisions represent resonant frequency for the particular pathogen or part of pathogen. Once the ramping function reaches the top of the frequency range, it returns to the low end of the frequency range and goes through another ramping function. The second ramping function can have frequency steps between the division A-f as shown. The ramping function can be one function, a combination of two ramping functions, or some variation thereof. The particular frequency, time for each division, and overall ramp time, will be determined by the particular produce being cleaned, and the particular pathogens being attacked.

Figures 7A, 7B:
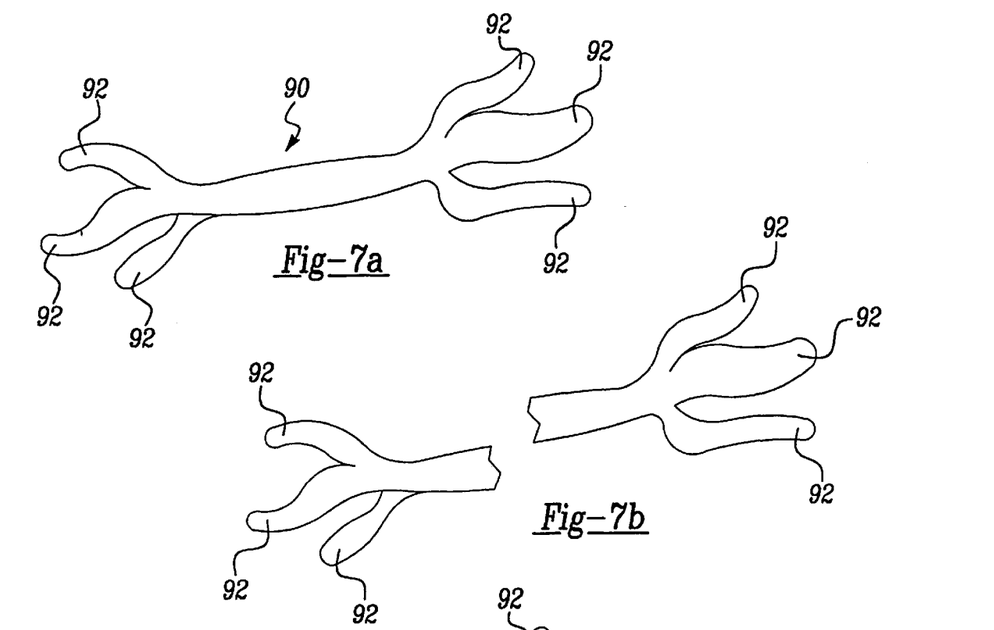
FIGS. 7(a)–7(c) show a pathogen being broken apart by the electromagnetic or mechanical waveforms of the invention to show the process for destroying the pathogen according to the invention.
Figure 7C:
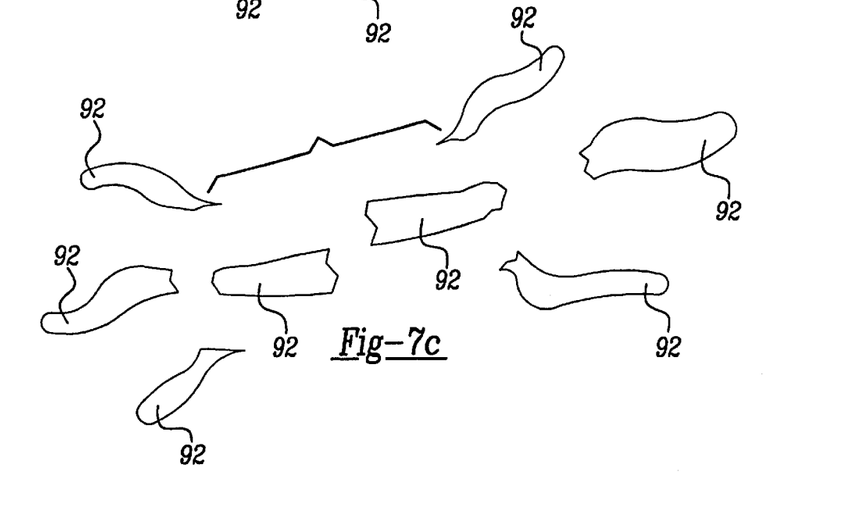

FIGS. 7(a)–7(c) shows a particular pathogen or bacteria 90 that is to be removed or destroyed from the particular produce being cleaned. In FIG. 7(a) the whole pathogen 90 has a certain size and appendages 92. The lower frequency may be selected to attack the pathogen at its initial size, and subsequent higher frequency steps may be used to attack the pieces 92 that break off from the initial pathogen 90 at different resonance frequencies, as shown in FIGS. 7(b) and 7(c).

An important role played by the carrier wave 60 is to establish an initial current through the solution in the tank 24. Those skilled in the art will appreciate that if only a minute electrical field were applied to either end or side of a relatively large tank, there would no current flow through the liquid. The transformation of electrical energy into the solution is accomplished both by the application of the electrical field potential and by the flow of electrical current in the solution. Ultimately, it is best if the electrical current is actually induced in the solution itself, because this electrical current can serve to disrupt cellular structures. For example, a small electrical microcurrent established in a filament-like synthetic chemical structure will in some instances cause that structure to explode, and/or at least detach from the epithelial layer of the produce.

In addition, the precise current levels depend upon the size and geometry's of the fruit or vegetable being cleaned in the tank 24. For example, since the solution is ionic, and thus carries current, the typical circular produce acts as a Faraday cell, having zero potential at its center. The electric currents flowing through the liquid solution in the tank 24 will naturally be impeded by the presence of a round fruit, such as a plum or blueberry, in the solution. Accordingly, as is well known, the higher frequency electrical currents will tend to travel along the skin of the produce as it travels from one point in the tank 24 to another. The electric field is a tenser, represented by a multitude of parallel vectors stretching from one electrode 56 or 58 to the other in the tank 24. The presence of the produce is like a ball in the tenser field, and the lines of electric field force naturally will wrap around this substantially spherical obstruction, causing the concentration of the electrical field on the surface of the produce.

The ionic nature of the solution in the tank 24 is dictated by the components which make up both the solvent (which is preferably water) and the solute and any additives. Preferably, any additives would be entirely natural, and be comprised of primary inorganic salts which form ions in a water based solution. For example, an acidic solution with a pH of less than 7 can be produced by the use of such free agents as hydrochloric acid, sulfuric acid, acetic acid or any other suitable organic acid. In addition, inorganic compounds like sodium chloride, potassium chloride, calcium chloride and/or combinations of the above may be utilized. To form an alkaline bath with a pH above 7, solutes such as calcium hydroxide, sodium hydroxide, potassium hydroxide and others may be used. In addition, organic solutes having an alkaline content including organic sugars, such as fructose, glucose, and sucrose may be employed. Further, synthetic compounds which naturally exhibit either a cationic or anionic signature in a water base solution may also be utilized either alone or in combination with the other above specified substances.

In a preferred process, a compound which normally has an alkaline signature, such as a banana, may be treated in an alkaline based solution, and subjected to ultrasonic energies and electrical energies to disrupt, disable, decouple and/or disintegrate the pathogens and other undesirable contaminants. Such an alkaline environment is well suited to be withstood by the banana which exhibits a natural alkaline surface. The exposure of the banana in such an alkaline environment may be as long as needed in order to induce substantially complete destruction of the pathogens and such.

Similarly, an acidic produce, such as an orange, may be subjected to an acidic tank and subjected to ultrasonic and electrical energies for accomplishing a similar destruction of pathogens and other contaminants.

In this regime of produce cleaning, the tank 14 with its multiple energies, has the beneficial result of antagonistically attacking the pathogens and other contaminants. Those skilled in the art will appreciate that microorganisms tend to propagate in a symbiotic environment. For example, contaminants on bananas are of an organic variety and typically prefer an alkaline environment. Accordingly, another preferred approach to this cleaning process is to expose alkaline-based produce to an acidic environment for a brief period of time so as to not destroy or damage any significant portion of the epithelial layer of the produce require or its long-term preservation until it can be consumed, but yet providing for the substantially complete destruction of pathogens and other organic contaminants which rely upon the alkaline environment for their survival. In particular, the exposure to the acidic environment, coupled with the severe mechanical agitation resulting from the ultrasonic energies, insure a substantially complete exposure of these alkaline-based organic contaminants to the acidic conditions of the solution, thus hastening their destruction and/or disruption or breakdown. The net result is the more efficient cleaning of the produce, while not destroying the natural protective epithelial tissue of the produce.

Similarly, an acidic based produce, such as a lemon or orange, can be temporarily subjected to an alkaline based washing solution, and exposed to electrical and mechanical energies. Such acidic based produce has symbiotic pathogens which exist in acidic environments, and will tend to disintegrate more quickly in the alkaline based solution. Once again, the mechanical agitation induced by the ultrasonic energies will result in the destruction of the pathogens and organic contaminants at a faster rate of speed.

The application of ultrasonic energy by the transducers 52 and 54 to the solution is effective because it tends to put the various appendages or macro-molecule chains existing on the produce into a rapid mode of oscillation. This mode of oscillation is the most extreme as the ultrasonic energy frequency nears a resonant frequency for the particular physical structure that the pathogen or organic contaminant represents. For example, if a particular macro-molecule oscillates at 35–40 kHz, an ultrasonic energy of sufficiently high amplitude at that frequency will first result in the decoupling of that macro-molecule from the epithelial layer of the produce, followed by its disintegration as the structure oscillates back and forth so violently that it literally breaks apart. Similarly, smaller structures typically vibrate at higher frequencies, so higher frequency ranges can also be utilized.

Figure 8:
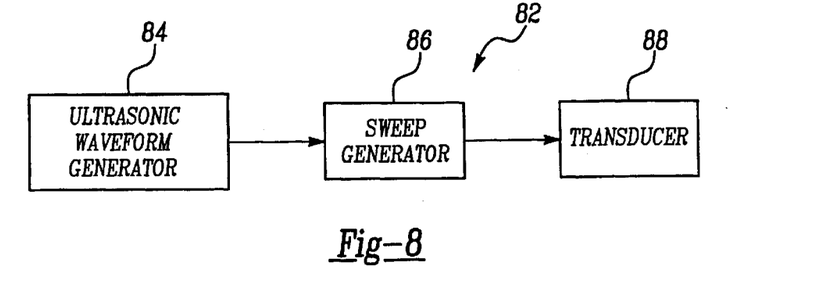
FIG. 8 is a schematic block diagram identifying the electronics to operate the ultrasonic transducers.

FIG. 8 shows a schematic block diagram 82 depicting the electronics used for the transducers 52 and 54. An ultrasonic waveform generator 84 generates the ultrasonic wave introduced into the tank 24. A sweep generator 86 sweeps the ultrasonic frequency within a predetermined range, consistent with the discussion herein. The ultrasonic frequency signal is then sent to a transducer 88 that represents the transducers 52 and 54.

The sweeping of the ultrasonic frequencies can also be ramped in a steplike manner as shown in FIG. 6 to attack various pathogens and the like having different sizes and different resonance frequencies. Of course, the frequencies used would be in the ultrasonic frequency range, and would be selected accordingly.

The electrical energy provided by the electrical waveform that provides the decoupling, fragmentation and disintegration of the various pathogens is a function of the total energy applied to the specific pathogen. The total critical cleaning energy equals the sum of the electric voltage field (with a DC component and an AC component), plus the ultrasonic energy applied to assist the mechanical stress and strain in the structure, plus the chemical solutes, which act at the atomic level to exert decoupling forces upon the covalent and ionic bonds holding the organism together. The velocity of the mechanical turbulence created by the swirling flow of the solution, plus the ionic forms of the solute, again exert a molecular electrical energy to cause a disruption of both existing chemical bonds holding the pathogens and/or contaminants together. This promotes a chemical reaction within the solution to transform the pathogens, either with a strong acidic compound hydrogen ion or a cationic form, so as to totally disrupt and transform the cellular walls and membranes into a harmless form of elemental molecules which have substantially less harmful effect.

Accordingly, for one aspect of the invention, an ultrasonic frequency generator that sweeps from lower frequencies to higher frequencies could be utilized. Multiple sweeps would be provided for the destruction of increasingly smaller particles. For example, a large organic contaminant, such as E. coli bacteria, may first decouple at 25 kHz, and then may also begin to break apart into smaller pieces. Typically such bacterial structures exist as multi-cell organisms with each cell capable of providing for replication and contamination of a subsequent person who eats the bacteria. Accordingly, it is useful to break up the bacterial chain by first decoupling it from the epithelial layer of the produce, and then individually attacking the cells. The cellular destruction can be assured by first decoupling at a lower frequency, such as 25 kHz, and then hitting it at a higher resonant frequency, such as 30 kHz, to provide for the breakdown of the multi-cell chain into individual chain fragments. Then the produce can be exposed to an even higher frequency, for example 40 kHz, to provide for the breakdown of those cell fragments into individual cells, followed by a higher frequency yet, such as 50, 60, or 70 kHz to cause the vibration and ultimate cell disintegration of the cellular walls of the bacteria. Once the cellular walls of the bacteria are disrupted and their nuclei are released, still higher frequencies on the order of 100 kHz to 200 kHz will result in the disruption of the nuclei into smaller protein fragments which are typically much less harmful than the original bacteria in an individual multi-celled form.

The discussion herein describes a produce cleaning process for destroying, removing and/or incapacitating various pathogens and the like that may exist on the produce. One or more of the combination of the bioelectrification energy, the ultrasonic energy, the chemical solutes in the solution, the swirling flow of the water in the tank 24, and/or the heating of the solution provides this type of produce cleaning.

The foregoing discussion discloses and describes merely exemplary embodiments of the present invention. One skilled in the art will readily recognize from such discussion, and from the accompanying drawings and claims, that various changes, modifications or variations can be made therein without departing from the spirit and scope of the invention as defined in the following claims.

What is claimed is:

1. A method of cleaning produce, comprising the steps of:

immersing the produce in an energizing bath;

subjecting the produce to an alternating electrical waveform for a predetermined period of time in the energizing bath; and subjecting the produce to an ultrasonic waveform to vibrate the produce for a predetermined period of time in the energizing bath, wherein the combination of the ultrasonic waveform and the electrical waveform applies sufficient energy to decouple and neutralize pathogens and other contaminants existing on the produce.

2. The method according to claim 1, wherein the step of subjecting the produce to the electrical waveform includes subjecting the produce to an alternating electrical waveform that includes a fundamental carrier wave and a higher frequency wave imposed on the carrier wave.

3. The method according to claim 2, wherein the step of subjecting the produce to the electrical waveform includes generating the carrier wave at a current sufficient enough to establish an electric current in the energizing bath and generating a higher frequency wave that has a frequency sufficient to provide microelectrification of bacteria and pathogens on the produce.

4. The method according to claim 2, wherein the carrier wave has a frequency in the range of 10 Hz to 100 kHz and an electrical current in the range of 1 milliamp per square centimeter to 1,000 milliamps per square centimeter in the bath.

5. The method according to claim 1, wherein the step of subjecting the produce to the electrical waveform includes sweeping the electrical waveform from a first predetermined frequency to a second predetermined frequency.

6. The method according to claim 5, wherein the step of sweeping the electric waveforms from the first predetermined ultrasonic frequency to the second ultrasonic predetermined frequency includes ramping the electrical waveform in a step like manner where each step is at a higher frequency than a previous step and is maintained at the step for a predetermined period of time.

7. The method according to claim 1, wherein the step of subjecting the produce to an ultrasonic waveform includes sweeping the ultrasonic waveform between a first ultrasonic frequency and a second ultrasonic frequency.

8. The method according to claim 7, wherein the step of sweeping the ultrasonic waveform from the first ultrasonic frequency to the second ultrasonic frequency includes ramping the ultrasonic waveform in a step like manner where each step is at a higher frequency than a previous step and is maintained at the step for a predetermined period of time.

9. The method according to claim 1, wherein the step of immersing the produce in an energizing bath includes immersing the produce in a heated energizing bath.

10. The method according to claim 9, wherein in the step of immersing the produce in an energizing bath includes immersing the produce in an energizing bath heated to about 95° F.

11. The method according to claim 1, wherein the step of immersing the produce in an energizing bath includes immersing the produce in a water based ionizing bath.

12. The method according to claim 11, wherein the step of immersing the produce in the ionizing bath includes immersing the produce in a bath including dissolved salts.

13. The method according to claim 1, wherein the step of immersing the produce in an energizing bath includes immersing the produce in an acid bath having a pH less than 7.

14. The method according to claim 1, wherein the step of immersing the produce in an energizing bath includes immersing the produce in an alkaline bath having a pH greater than 7.

15. A method of cleaning produce, comprising the steps of:

immersing the produce in a liquid-based bath;

subjecting the produce to an ultrasonic waveform to apply mechanical vibrations to the produce in the bath for a predetermined period of time; and sweeping the ultrasonic waveform between a first ultrasonic frequency and a second ultrasonic frequency so as to decouple and disintegrate a range of various pathogens and contaminants having different sizes that may exist on the produce, and wherein the step of sweeping the ultrasonic waveform between the first frequency and the second frequency includes ramping the ultrasonic waveform in a step like manner where each successive step is at a higher frequency and is maintained at that step for a predetermined period of time.

16. The method according to claim 15, wherein the step of sweeping the ultrasonic waveform between the first frequency and the second frequency includes ramping the ultrasonic waveform in a step like manner through a series of at least four distinct steps, with at least one of the steps having a frequency at least double the frequency of one of the previous steps in the series.

17. The method according to claim 15, wherein the step of immersing the produce in an energizing bath includes immersing the produce in a heated energizing bath.

18. The method according to claim 17, wherein in the step of immersing the produce in an energizing bath includes immersing the produce in an energizing bath heated to about 95° F.

19. The method according to claim 15, wherein the step of immersing the produce in an energizing bath includes immersing the produce in a water based ionizing bath.

20. The method according to claim 19, wherein the step of immersing the produce in the ionizing bath includes immersing the produce in a bath including dissolved salts.

21. The method according to claim 15, wherein the step of immersing the produce in an energizing bath includes immersing the produce in an acid bath having a pH less than 7.

22. The method according to claim 15, wherein the step of immersing the produce in an energizing bath includes immersing the produce in an alkaline bath having a pH greater than 7.

* * * * *